United States Patent [19]

Nahamoo et al.

[11] Patent Number: 5,729,656
[45] Date of Patent: Mar. 17, 1998

[54] REDUCTION OF SEARCH SPACE IN SPEECH RECOGNITION USING PHONE BOUNDARIES AND PHONE RANKING

[75] Inventors: David Nahamoo, White Plains; Mukund Padmanabhan, Ossining, both of N.Y.

[73] Assignee: International Business Machines Corporation, Armonk, N.Y.

[21] Appl. No.: 347,013

[22] Filed: Nov. 30, 1994

[51] Int. Cl.$^6$ .................................................... G10L 5/06
[52] U.S. Cl. ............................................................ 395/2.63
[58] Field of Search .................................. 381/41, 42, 43; 395/2.6, 2.62–2.66, 2.4

[56] References Cited

U.S. PATENT DOCUMENTS

| | | | |
|---|---|---|---|
| 4,718,094 | 1/1988 | Bahl et al. | 381/43 |
| 4,741,036 | 4/1988 | Bahl et al. | 381/43 |
| 4,773,093 | 9/1988 | Higgins et al. | 381/42 |
| 4,803,729 | 2/1989 | Baker | 381/43 |
| 4,805,219 | 2/1989 | Baker et al. | 381/43 |
| 4,813,074 | 3/1989 | Marcus | 381/36 |
| 4,852,173 | 7/1989 | Bahl et al. | 381/43 |
| 4,977,599 | 12/1990 | Bahl et al. | 381/43 |
| 5,027,408 | 6/1991 | Kroeker et al. | 381/43 |
| 5,144,671 | 9/1992 | Mazor et al. | 381/36 |
| 5,222,146 | 6/1993 | Bahl et al. | 381/41 |
| 5,233,681 | 8/1993 | Bahl et al. | 395/2 |
| 5,263,117 | 11/1993 | Nadas et al. | 395/2 |
| 5,280,562 | 1/1994 | Bahl et al. | 395/2 |
| 5,293,584 | 3/1994 | Brown et al. | 395/2.86 |
| 5,390,278 | 2/1995 | Gupta et al. | 395/2.52 |

FOREIGN PATENT DOCUMENTS

| | | | |
|---|---|---|---|
| 0313975 A2 | 5/1989 | European Pat. Off. | G06F 15/36 |
| 0387602 A2 | 9/1990 | European Pat. Off. | G01L 5/06 |
| 0424655 A2 | 5/1991 | European Pat. Off. | G10L 5/06 |

OTHER PUBLICATIONS

L.R. Bahl et al., "Faster Acoustic Match Computation", IBM Technical Disclosure Bulletin, vol. 23, No. 4, Sep. 1980, pp. 1718–1719.

P.S. Gopalakrishnan et al., "Channel–Bank–Based Thresholding to Improve Search Time in the Fast–Match", IBM Technical Disclosure Bulletin, vol. 37, No. 02A, Feb. 1994, pp. 113–114.

V. Algazi et al., "Transform Representation of the Spectra of Acoustic Speech Segments With Applications I: General Approach and Application to Speech Recognition", IEEE Transactions on Speech and Audio Processing, vol. 1, No. 2, Apr., 1993 pp. 180–195.

L. Bahl, "A FAst Approximate Acoustic Match for Large Vocabulary Speech Recognition", IEEE Transactions on Speech and Audio Processing, vol. 1, No. 1, Jan. 1993, pp. 59–67.

*Primary Examiner*—Allen R. MacDonald
*Assistant Examiner*—Robert Mattson

[57] ABSTRACT

A method for estimating the probability of phone boundaries and the accuracy of the acoustic modelling in reducing a search-space in a speech recognition system. The accuracy of the acoustic modelling is quantified by the rank of the correct phone. The system includes a microphone for converting an utterance into an electrical signal, which is processed by an acoustic processor and label match which finds the best-matched acoustic label prototype. A probability distribution on phone boundaries is produced for every time frame using a first decision tree. These probabilities are compared to a threshold and some time frames are identified as boundaries between phones. An acoustic score is computed for all phones between every given pair of hypothesized boundaries, and the phones are ranked on the basis of this score. A second decision tree is traversed for every time frame to obtain the worst case rank of the correct phone at that time, and a short list of allowed phones is made for every time frame. A fast acoustic word match processor matches the label string from the acoustic processor to produce an utterance signal which includes at least one word. From recognition candidates produced by the fast acoustic match and the language model, the detailed acoustic match matches the label string from the acoustic processor against acoustic word models and outputs a word string corresponding to an utterance.

10 Claims, 5 Drawing Sheets

FIG. 1.
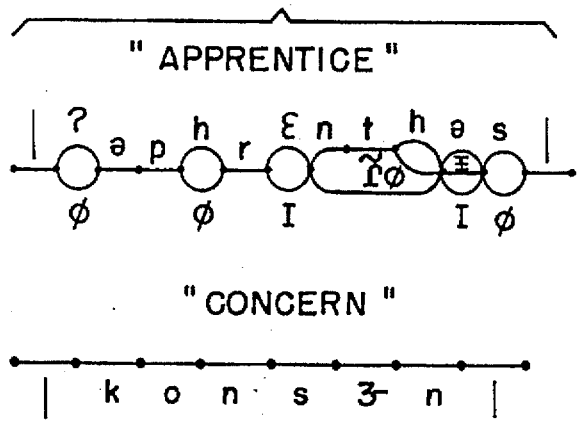
"CONCERN"
| k o n s ɜ˞ n |
FIG. 2.
MARKOV MODEL
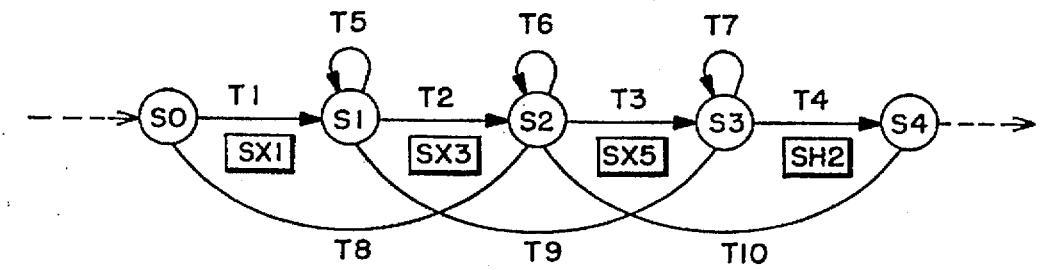
FIG. 3.
| PHONE | STATE | TRANS-ITION | ARC PROB. | OUTPUT PROBABILITIES L001 L002    L200 | WEIGHT |
|---|---|---|---|---|---|
| PH1 | S10 | T101 | 0.75 | 0.03  0.00 ........... 0.13 | W(1) |
|  |  | T102 | 0.25 |  |  |
|  | S11 | T111 | 0.50 |  |  |
|  |  | T112 | 0.25 |  |  |
|  |  | T113 | 0.25 |  |  |
|  | S12 | T121 |  |  |  |
|  |  | T122 |  |  |  |
|  |  | T123 |  |  |  |
|  | S13 | T131 |  |  |  |
|  |  | T132 |  |  |  |
| PH2 | S20 | T201 |  |  | W(2) |
|  |  | T202 |  |  |  |
| PHN | SN0 | TN01 |  |  | W(N) |
|  |  | TN02 |  |  |  |
|  | SN1 | TN11 |  |  |  |
|  |  | TN12 |  |  |  |
|  |  | TN13 |  |  |  |
|  | SN2 | TN21 | 0.3 |  |  |
|  |  | TN22 | 0.7 | 0.25  0.12 ........... 0.00 |  |
| STATISTICAL WORD MODEL ||||| W(∅) |

REDUCTION OF SEARCH SPACE IN SPEECH RECOGNITION USING PHONE BOUNDARIES AND PHONE RANKING

TECHNICAL FIELD

The invention pertains to speech recognition, and in particular phone boundary detection in the acoustic input.

TERMS

Symbol: Characterizing acoustic speech based on n features, acoustic speech is viewed in an n-dimensional acoustic space. The space is partitioned into regions, each of which is identified by an n-dimensional prototype vector. Each prototype vector is represented by a "symbol", such as a number or other identifier. Uttered speech may be viewed as successive "symbols".

Feneme (also Label): A symbol corresponding to a prototype vector, the symbol being defined based on features of sound occurring during a fixed interval of time. Sound may be characterized as having, for example, twenty features— the magnitude of each feature during a centisecond interval corresponding to a prototype vector component. Each prototype vector thus has a corresponding set of feature values for a centisecond interval. Based on the feature values generated during a centisecond interval, one prototype vector from a fixed set of prototype vectors is selected as the closest. With each prototype vector having a corresponding feneme (or label), the set of prototype vectors corresponds to an alphabet of fenemes (or labels). Sample fenemes are listed in Table 1—the first feneme 001 being defined as AA11.

TABLE 1

THE TWO LETTERS ROUGHLY REPRESENT
THE SOUND OF THE ELEMENT.
TWO DIGITS ARE ASSOCIATED WITH VOWELS:
FIRST: STRESS OF SOUND
SECOND: CURRENT IDENTIFICATION NUMBER
ONE DIGIT ONLY IS ASSOCIATED
WITH CONSONANTS
SINGLE DIGIT: CURRENT IDENTIFICATION NUMBER

| | | | | |
|---|---|---|---|---|
| 001 AA11 | 029 BX2- | 057 EH02 | 148 TX5- | 176 XX11 |
| 002 AA12 | 030 BX3- | 058 EH11 | 149 TX6- | 177 XX12 |
| 003 AA13 | 031 BX4- | 059 EH12 | 150 UH01 | 178 XX13 |
| 004 AA14 | 032 BX5- | 060 EH13 | 151 UH02 | 179 XX14 |
| 005 AA15 | 033 BX6- | 061 EH14 | 152 UH11 | 180 XX15 |
| 006 AE11 | 034 BX7- | 062 EH15 | 153 UH12 | 181 XX16 |
| 007 AE12 | 035 BX8- | 126 RX1- | 154 UH13 | 182 XX17 |
| 008 AE13 | 036 BX9- | 127 SH1- | 155 UH14 | 183 XX18 |
| 009 AE14 | 037 DH1- | 128 SH2- | 156 UU11 | 184 XX19 |
| 010 AE15 | 038 DH2- | 129 SX1- | 157 UU12 | 185 XX2- |
| 011 AW11 | 039 DQ1- | 130 SX2- | 158 UXG1 | 186 XX20 |
| 012 AW12 | 040 DQ2- | 131 SX3- | 159 UXG2 | 187 XX21 |
| 013 AW13 | 041 DQ3- | 132 SX4- | 160 UX11 | 188 XX22 |
| 014 AX11 | 042 DQ4- | 133 SX5- | 161 UX12 | 189 XX23 |
| 015 AX12 | 043 DX1- | 134 SX6- | 162 UX13 | 190 XX24 |
| 016 AX13 | 044 DX2- | 135 SX7- | 163 VX1- | 191 XX3- |
| 017 AX14 | 045 EE01 | 136 TH1- | 164 VX2- | 192 XX4- |
| 018 AX15 | 046 EE02 | 137 TH2- | 165 VX3- | 193 XX5- |
| 019 AX16 | 047 EE11 | 138 TH3- | 166 VX4- | 194 XX6- |
| 020 AX17 | 048 EE12 | 139 TH4- | 167 WX1- | 195 XX7- |
| 021 BQ1- | 049 EE13 | 140 TH5- | 168 WX2- | 196 XX8- |
| 022 BQ2- | 050 EE14 | 141 TQ1- | 169 WX3- | 197 XX9- |
| 023 BQ3- | 051 EE15 | 142 TQ2- | 170 WX4- | 198 ZX1- |
| 024 BQ4- | 052 EE16 | 143 TX3- | 171 WX5- | 199 ZX2- |
| 025 BX1- | 053 EE17 | 144 TX1- | 172 WX6- | 200 ZX3- |
| 026 BX10 | 054 EE18 | 145 TX2- | 173 WX7- | |
| 027 BX11 | 055 EE19 | 146 TX3- | 174 XX1- | |
| 028 BX12 | 056 EH01 | 147 TX4- | 175 XX10 | |

An acoustic processor examines uttered speech one interval after another and, based on which prototype vector is closest by some measure to the feature values, the feneme for the closest prototype vector is assigned to the interval. The feneme is distinguished from the well-known phoneme in that the former is based on feature values examined over a fixed interval of time (e.g., a centisecond) whereas the latter is based on a predefined set of basic phonetic sound units without regard to time limitations.

Markov Model (also probabilistic finite state machine): A sound event can be represented as a collection of states connected to one another by transitions which produce symbols from a finite alphabet. Each transition from a state to a state has associated with it a probability which is the probability that a transition t will be chosen next when a state s is reached. Also, for each possible label output at a transition, there is a corresponding probability. The model starts in one or more initial states and ends in one or more final states.

Phone: A unit of sound for which a Markov model is assigned. A first type of phone is phonetically based, each phoneme corresponding to a respective phone. A standard set of phonemes are defined in the International Phonetic Alphabet. A second type of phone is feneme-based, each feneme corresponding to a respective phone.

Polling: From a training text, it is determined how often each label occurs in each vocabulary word. From such data, tables are generated in which each label has a vote for each vocabulary word and, optionally, each label has a penalty for each word. When an acoustic processor generates a string of labels, the votes (and penalties) for each vocabulary word are computed to provide a match value. The process of tallying the votes is "polling".

In some known approaches to speech recognition, words are represented by phone-based Markov models and input speech which, after conversion to a coded sequence of acoustic elements or labels, is decoded by matching the label sequences to these models, using probabilistic algorithms such as Viterbi decoding.

BACKGROUND

A. Overview of Speech Recognition (1) Labeling of Speech Input Signal A preliminary function of this speech recognition system is the conversion of the speech input signal into a coded representation. This is done in a procedure that was described for example in "Continuous Speech Recognition with Automatically Selected Acoustic Prototypes Obtained by either Bootstrapping or Clustering" by A. Nadas et al, Proceedings ICASSP 1981, pp. 1153–1155, incorporated herein by reference.

In accordance with the Nadas et al conversion procedure, speech input is divided into centisecond intervals. For each centisecond interval, a spectral analysis of the speech input is made. A determination is then made as to which of a plurality of predefined spectral patterns the centisecond of speech input most closely corresponds. A "feneme" that indicates which spectral pattern most closely conforms to the speech input is then assigned to the particular centisecond interval. Each feneme, in turn, is represented as a distinct label.

A string of labels (or fenemes) thereby represents successive centiseconds of speech which, in turn, form words.

A typical finite set of labels is shown in Table 1 which is appended to this specification. It comprises about 200 labels each of which represents an acoustic element. It should be noted that these acoustic elements are shorter than the usual "phonemes" which roughly represent vowels or consonants of the alphabet, i.e., each phoneme would correspond to a sequence of labeled acoustic elements.

An important feature of this labeling technique is that it can be done automatically on the basis of the acoustic signal and thus needs no phonetic interpretation. The unit which does the conversion from the acoustic input signal to a coded representation in the form of a label string is called an "acoustic processor".

(2) Statistical Model Representation of Words

The basic functions of a speech recognition system in which the present invention can be used will be described here briefly though several publications are also available which give more details of such a system, in particular F. Jelinek, "Continuous Speech Recognition by Statistical Methods", Proceedings IEEE, Vol. 64, 1976, pp. 532–576, incorporated by reference.

In the system, each word of the recognition vocabulary is represented by a baseform wherein the word is divided for recognition purposes into a structure of phones, i.e. phonetic elements as shown in FIG. 1. These phones correspond generally to the sounds of vowels and consonants as are commonly used in phonetic alphabets. In actual speech, a portion of a word may have different pronunciations as is indicated by the parallel branches in FIG. 1. The parallel branches which extend between nodes through which all such branches pass may alternatively be considered together as a "clink" or as separate conventional phones. The clink, as the principles of this invention apply, may be viewed as a substitute phonetic element for the phones discussed hereinbelow. The phones in turn, are represented by Markov models. Referring now to FIG. 2 a sample Markov model for a phone is illustrated. For each phone there is a corresponding Markov model characterized by (a) a plurality of states (S0 ... S4), (b) transitions (T1 ... T10) between the states, and (c) label probabilities, each representing the likelihood that the phone will produce a particular label at a given transition. In one embodiment each transition in the Markov model has two hundred stored label probabilities associated therewith, each probability representing the likelihood that each respective label (of a set of 200 labels) is produced by the phone at a given transition. Different phones are distinguished in their respective Markov models by differences in the label probabilities associated with the various transitions. The number of states and transitions therebetween may differ but, preferably, these factors remain the same and the stored label probabilities vary.

In the Markov model of FIG. 2, a string of labels SX1-SX3-SX5-SH2 (taken from Table 2) has entered the phone model in the order shown. The probability of each label occurring at the transition at which it is shown (e.g. SX1 at transition T1) is determined based on the corresponding stored label probability. Phone models having the highest label probabilities for the labels in the string are the most likely phones to have produced the string.

While the labels in FIG. 2 suggest continuity from label to label along transition to transition—which enables a simple one-to-one alignment between string label and transition—the Markov model of FIG. 2 also permits other alignment as well. That is, the Markov model of FIG. 2 can determine that a phone is likely even where more labels, less labels, or even different labels are applied to the phone model. In this regard, besides transitions from one state to another, there are also transitions (T5, T6, T7) that go back to the same state that was just left. Furthermore, there are transitions (T8, T9, T10) that skip a neighbor state. The Markov model thereby provides that different pronunciations of a phone can be accommodated in the same basic Markov model. If, for example, a sound is stretched (slow speaker) so that the same acoustic element appears several times instead of only once as usual, the Markov model representation allows several transitions back to the same state thus accommodating the several appearances of the acoustic element. If, however, an acoustic element that usually belongs to a phone does not appear at all in a particular pronunciation, the respective transition of the model can be skipped.

Any possible path (Markov chain) from the initial state to the final state of the Markov model (including multiple occurrences of the turnback transitions, T5, T6 or T7) represents one utterance of the word (or phone), one acoustic element or label being associated with each transition.

In the present invention, label strings are "aligned" to Markov models by associating labels in the string with transitions in a path through the model; determining probabilities of each label being at the associated transition, on the basis of stored label probabilities set by previous experiences or training (as explained below). A chain of Markov models having the highest probability identifies the word that is to be selected as output.

The baseforms of the words and the basic Markov models of phones can be derived and defined in different ways, as described in the cited literature. Model generation may be done by a linguist, or the models can be derived automatically using statistical methods. As the preparation of the models is not part of the invention, it will not be described in more detail.

It should be mentioned that instead of representing words first by a sequence of Markov phone models, they could also be directly represented by Markov word models—as by a sequence of states and transitions that represent the basic string of acoustic elements for the whole word.

After structuring of the basic models that represent the words in a vocabulary, the models must be trained in order to furnish them with the statistics (e.g. label probabilities) for actual pronunciations or utterances of all the words in the vocabulary. For this purpose, each word is spoken several times, and the label string that is obtained for each utterance is "aligned" to the respective word model, i.e. it is determined how the respective label string can be obtained by stepping through the model, and count values are accumulated for the respective transitions. A statistical Markov model is formulated for each phone and thus for each word as a combination of phones. From the Markov model it can be determined with what probability each of various different label strings were caused by utterance of a given word of the vocabulary. A storage table representing such a statistical Markov model is shown in FIG. 3 and will be explained in more detail in a later section.

For actual speech recognition, the speech signal is converted by the acoustic processor to a label string which is then "matched" against the existing word models. A specific procedure, the Viterbi Algorithm (described briefly in the above mentioned Jelinek paper and in more detail in a paper by G. D. Forney, "The Viterbi Algorithm", Proceedings, IEEE, Vol. 61, 1973, pp. 268–278, both of which are incorporated by reference) is used for this, and the result is a probability vector for each of a number of "close" words which may have caused the given label sequence. Then the actual output, i.e. the identification of a word that is selected as the recognition output, is determined by selecting the word whose probability is found to have the highest generated probability vectors.

The estimation of phone probabilities is an essential part of "the match". Typically, the recognition is carried out in a maximum likelihood framework, where all words in the vocabulary are represented as a sequence of phones, and the probability of a given acoustic feature vector, conditioned on the phone is computed (i.e. P (acoustic/phone)). The recognition process hypothesizes that a given word in the vocabulary is the correct word and computes a probabilistic score for this word as described above; this is done for all words in the vocabulary, subsequently, the acoustic score is combined with a score provided by a language model, and the word with the highest combined score is chosen to be the correct one.

The probability P (acoustic/phone) is equal to the probability that the current state of the Markov model for the phone produces the observed acoustic vector at the current time, and this probability is accumulated over several time frames till the cumulative product falls below a defined threshold, at which point it is hypothesized that the phone has ended and the next phone has started. In this technique, it is possible that in computing this score, frames that do not actually belong to the current phone are also taken into account while computing the score for the phone. This problem can be avoided if the beginning and end times of a phone are known with a greater level of certainty. A technique to estimate the boundary points is given in ["Transform Representation of the Spectra of Acoustic Speech Segments with Applications—I: General Approach and Speech Recognition", IEEE Transactions on Speech and Audio Processing, PP. 180–195, vol. 1, no. 2, April 1993 incorporated by reference], which is based on using the relative variation between successive frames, however it is quite expensive computationally, and is also constrained in terms of the extent of the acoustic context that it considers.

In some speech recognition systems, "the match" is carried out in two stages. The first stage of the decoder provides a short list of candidate words, out of the 20K vocabulary. Subsequently, detailed models of the words in this short list are used to match the word to the acoustic signal, and the word with the highest score is chosen. The process for determining the short list, called the fast match (See U.S. Pat. No. 5,263,117 incorporated herein by reference and titled "Method and Apparatus for Finding the Best Splits in a Decision Tree for a Language Model"), organizes the phonetic baseforms of the words in the vocabulary in the form of a tree, and traverses down this tree, computing a score for each node, and discarding paths that have scores below a certain threshold. A path comprises of a sequence of phones, and often, the score for several phones has to be computed before a decision can be made to discard the path. In an earlier invention ("Channel-Bank-Based Thresholding to Improve Search Time in the Fast Match", IBM TDB pp. 113–114, vol. 37, No. 02A, February 1994), a method was described, whereby, by observing the output of a channel-bank, a poor path could be discarded at a very early stage, thus saving the cost of computing the scores for the remaining phones on the path. In "Channel-Bank-Based Thresholding to Improve Search Time in the Fast Match", IBM TDB pp. 113–114, vol. 37, No. 02A, February 1994 (which reference is incorporated) the channel-bank outputs were computed in a "blind" fashion, as no information was available about the start and end times of a phone in the acoustic label sequence. In this invention, we describe a method of computing the channel-bank outputs in a more intelligent fashion, that results in a reduction in the overall error rate and also reduces the computation time of the fast match.

This invention proposes an alternative technique to predict phone boundaries that enables the use of an extended acoustic context to predict whether the current time is a phone boundary. The invention uses a non-linear decision-tree-based approach to solve the problem. The quantized feature vectors at, and in the vicinity of, the current time are used to predict the probability of the current time being a phone boundary, with the mechanism of prediction being a decision tree. The decision tree is constructed from training data by designing binary questions about the predictors such that the uncertainty in the predicted class is minimized by asking the question. The size of the class alphabet here is 2, and the technique of [L. Breiman, J. H. Friedman, R. A. Olshen, C. J. Stone, "Classification and Regression Trees", Wadsworth, Inc., 1984, incorporated by reference] is used to design the questions for each predictor.

The invention also describes a technique that can be used to further cut down the search space of the speech recognition system. Assuming that the phone boundaries are known, it is possible to compute the score for all phones in the segment between two phone boundaries, and compute the rank of the correct phone in this segment. Ideally, of course, the correct phone should be ranked first, and it should be possible to eliminate all phones other than the topmost phone from the search space. However, in reality, due to ambiguities in the acoustic modelling, the vector-quantized acoustic feature vectors in the segment may not be representative of the sound or phone which was actually uttered in the segment. Consequently, the rank of the correct phone could be quite poor in certain segments.

The invention also describes a decision-tree-based technique to predict the worst case rank of the correct phone between two hypothesized phone boundaries. Once this worst case rank is known, all the phones that are ranked below the worst case rank are eliminated from the search space of the recognizer, resulting in a large saving in computation. Note that the technique is independent of the method used to compute the score for a phone; typical schemes are (a) the usual Markov-model based computation (b) a channel-bank-based computation as described in ["Channel-Bank-Based Thresholding to Improve Search Time in the Fast Match", IBM TDB pp. 113–114, vol. 37, No. 02A, February 1994] and (c) a decision-tree-based scoring mechanism, as described in [co-pending U.S. patent application, D. Nahamoo, M. Padmanabhan, M. A. Picheny, P. S. Gopalkrishnan, "A Decision Tree Based pruning strategy for the Acoustic Fast Match, IBM Attorney Docket YO 996-059], or any alternative scoring mechanism.

The predictors used in the decision tree are, as before, the quantized acoustic feature vectors at, and in the vicinity of, the current time, and the predicted quantity is the worst case rank of the correct phone at the current time. The decision tree is constructed from training data by designing binary questions about the predictors, which are asked while traversing down the nodes of the decision tree. The questions are designed to minimize the uncertainty in the predicted class. Unlike the previous case of boundary estimation, however, the size of the class alphabet is equal to the number of phones, which is typically much larger than 2, and the technique outlined in ["Method and Apparatus for Ginding the Best Splits in a Decision Tree for a Language Model for a Speech Recognizer, U.S. Pat. No. 5,263,117] is used to design the questions for each node.

SUMMARY OF THE INVENTION

The objective of the invention is to take the given vector-quantized feature vectors at the current time t, and the adjacent N time frames on either side, and devise two decision-trees. The first decision-tree should give the probability of the current frame being a phone boundary, and the second decision tree should give a distribution over all possible ranks that the correct phone can take at that time, from which the worst case rank of the current phone can be obtained.

A decision tree having true or false (i.e., binary) questions at each node and a probability distribution at each leaf is constructed. Commencing at the root of the tree, by answering a question at each node encountered and then following a first or second branch from the node depending upon whether the answer is "true" or "false", progress is made toward a leaf. The question at each node is phrased in terms of the available data (e.g., the words already spoken) and is designed to ensure that the probability distribution at the leaves provide as much information as possible about the quantity being predicted.

A principal object of the invention is, therefore, the provision of a method of designing and constructing a binary decision tree having true or false questions at each node starting from the root of the tree towards a leaf.

Another object of the invention is the provision of a method of constructing a binary-decision tree using questions phrased in terms of the available known data and designed to ensure that the probability distribution at the leaves maximize the information about the quantity being predicted.

A further object of the invention is the provision of a method of constructing a binary decision tree primarily for use in speech pattern recognition.

Further and still other objects of the invention will become more clearly apparent when the following description is read in conjunction with the accompanying drawings.

The invention incorporates the following features:

a) The boundary points of phones in the acoustic label sequence are estimated by using a decision tree and the adjoining labels, i.e., in the context of the labels adjacent on both sides of the current label, a decision is made as to whether the current label represents the boundary point between two phones. In the remainder of this disclosure, the term "segment" will be used to denote the time interval between two boundary points.

b) Based only on the labels in a segment, a score is computed for all possible phones, based on the probabilities obtained from the decision tree described in ("Channel-Bank-Based Thresholding to Improve Search Time in the Fast Match", IBM TDB pp. 113–114, vol. 37, No. 02A, February 1994). As mentioned earlier, alternative scoring mechanisms could be used to compute the score for a phone. The phones are next ranked in accordance to their scores.

c) A decision is made that all phones above a certain rank are "good" phones that are possible in the time segment of interest, and that the phones below this threshold rank are "bad" phones that are not possible in the segment of interest. The threshold rank is not fixed but is a function of the label sequence in the current segment and the adjacent segment, and is obtained by using a decision tree. The decision is made on the basis of the label at the start of the segment and the adjacent labels on either side of this label.

d) To avoid errors due to the pruning, the number of candidate phones is now increased by using phone classes, i.e., from training data a list is made for each phone, of the phones that are confusable with it. When decoding, for every "good" phone obtained in step (c), all phones in the confusion class of the "good" phone are also designated as "good" phones.

e) An alternative to eliminating all "bad" phones from the search is to penalize the score for these bad phones in all subsequent computations in the fast match. All this is precomputed before the actual fast match.

The implementation of the algorithm in the decoder takes the following steps:

Given a sequence of labels, the following precomputation is done before the fast match: the phone probabilities are first computed from a decision tree as described in ("Channel-Bank-Based Thresholding to Improve Search Time in the Fast Match", IBM TDB pp. 113–114, vol. 37, No. 02A, February 1994). Subsequently, the boundary points of phones in the acoustic label sequence are determined by using the first decision tree described above, and the ranks of different phones are computed within all segments, based on the probabilities obtained from the decision tree of ("Channel-Bank-Based Thresholding to Improve Search Time in the Fast Match", IBM TDB pp. 113–114, vol. 37, No. 02A, February 1994). Then the threshold rank that should be applied in every segment is obtained by traversing down the second decision tree described above. The phones ranked above the threshold, and the phones in union of their confusion classes, are then designated as "good" phones, and the remainder as "bad" phones. The probabilities for the "bad" phones in the given segment are then penalized. This penalization is done both on the phone probabilities obtained from the decision tree of ("Channel-Bank-Based Thresholding to Improve Search Time in the Fast Match", IBM TDB pp. 113–114, vol. 37, No. 02A, February 1994), and on the acoustic fast match probabilities.

Subsequently, the fast match tree is pruned using the modified probabilities above, using the techniques described in ("Channel-Bank-Based Thresholding to Improve Search Time in the Fast Match", IBM TDB pp. 113–114, vol. 37, No. 02A, February 1994, "Transform Representation of the Spectra of Acoustic Speech. Segments with Applications—I: General Approach and Speech Recognition", IEEE Transactions on Speech and Audio Processing, PP. 180–195, vol. 1, no. 2, April 1993).

Hence, the training data used for the construction of the decision tree consists of sets of records of 2N+1 predictors (denoted by the indices $-N, \ldots 0, \ldots N$) and the class associated with index 0, (which is assumed to be known). The associated class, in the case of the first decision tree is a binary record that specifies whether or not the frame at index 0 is a phone boundary. The associated class, in the case of the second decision tree is the rank of the correct phone at index 0. The alphabet size of each predictor is in the hundred's, and the class alphabet size is either 2 in the case of the first decision tree, or typically 50 or so in the case of the second decision tree. The invention uses the technique described below to construct the two decision trees (note that the two trees are constructed independently of one another).

The invention uses a successive data partitioning and search strategy to determine the questions of the decision tree. Starting with all the training data at the root of the tree, the invention chooses one of the 2N+1 predictors and partitions the alphabet of the predictor into two non-overlapping sets. Subsequently, for all the training records at the current node, if the value of the chosen predictor lies in the first set, the record is assigned to the first set, otherwise it is assigned to the second set. Hence, the training data at the current node is distributed between two child nodes on the basis of the set membership of the selected predictor. The predictor and the partitioning of the alphabet are chosen in such a way that after the training data is partitioned as described above, the uncertainty in the predicted class is minimized. The procedure is repeated for each child of the current node, till the class uncertainty at a node (quantified by the entropy of the class distribution at the node) falls below a certain level, or till the amount of training data at a node falls below a certain level. After the tree is constructed, the class distribution at the terminal nodes of the tree is available, and is stored along with the questions of the tree.

For the case of the first decision tree, the stored quantity is simply the probability that the node is a phone boundary. For the case of the second decision tree, the quantity available at the nodes of the tree is a distribution over all possible ranks that the correct phone can take. The ranking of phones is based on an acoustic score computed for all phones between every given pair of hypothesized phone boundaries. This distribution is converted to a single number, a worst case rank, such that the probability that the rank of the correct phone is better than the worst case rank is stored at the node of the decision tree.

For the case of a single predictor and a class, Nadas and Nahamoo [U.S. Pat. No. 5,236,117] describe a technique to find the best binary question that minimizes the uncertainty in the predicted class. At the current node, this technique is applied independently to each of the 2N+1 predictors, and the best question for this predictor is determined. Subsequently, the best one among the 2N+1 predictors is determined as the one that provides the maximum reduction in class uncertainty and the question at the current mode is formulated as the best question for this prediction. Alternatively, the question at a node could also be made more complex, such that it depends on more than one predictor, or an inventory of fixed complex questions could be used, and the best question chosen as the one in this inventory that provides the maximum reduction in class uncertainty.

It is another object of the invention to describe means whereby the above described decision tree can be used in a speech recognizer. During recognition, the first decision tree is traversed till it reaches one of the terminal nodes, and the probability of the current time being a phone boundary is obtained from the terminal node of the decision tree. This is compared to a predetermined threshold, and if it is larger than the threshold, the current time is hypothesized to be a boundary point. Subsequently, the second decision tree is traversed for all time frames between two hypothesized phone boundaries, and the worst case rank of the correct phone is obtained from the terminal node of the decision tree, for all these time frames. The worst case rank is determined from a ranking of phones based on an acoustic score computed for all phones between every given pair of hypothesized phone boundaries. The worst of these worst case ranks is taken to be the worst case rank of the correct phone in that segment. Subsequently, the score for all phones is computed on the basis of that segment, and the phones are ranked according to their scores. Then the phones that are ranked below the worst case rank are discarded from the search, thus making up a shortlist of allowed phones for every segment between two hypothesized phone boundaries. This list may also be augmented further by considering phones that are confusable with each other, and by including every element of a "confusable" list in the short list whenever any one element in the confusable list is ranked above the worst case rank.

This information is used in the maximum likelihood framework to determine whether to carry out a match for a given word, by constraining the search space of the recognizer to the shortlist, rather than the space of the entire alphabet. Before carrying out the match for a given phone in a word, the above defined shortlist is checked to see if the phone can possibly occur at the given time, and if the phone does not occur in the shortlist, then the match for the current word is discarded.

The method and apparatus according to the invention are advantageous because (a) they provide a fast and accurate way of estimating phone boundaries, by enabling the match for a phone to be done within well defined boundaries thus leading to better accuracy (b) they provide a fast and accurate means of estimating the rank boundaries of the correct phone without requiring any knowledge about the identity of the correct phone, and thus enable the creation of a shortlist of allowed phones, which helps in greatly cutting down the search space of the speech recognizer. Further, the overhead associated with traversing the two decision tree's is negligible, as the questions asked in the decision tree simply involve the set membership of the selected predictor.

BRIEF DESCRIPTION OF THE DRAWINGS

FIG. 1 is an illustration of phonetic baseforms for two words;

FIG. 2 is a schematic representation of a Markov model for a phone;

FIG. 3 shows a partial sample of a table representing a statistical Markov model trained by numerous utterances.

DESCRIPTION OF THE PREFERRED EMBODIMENTS

Figure 4:
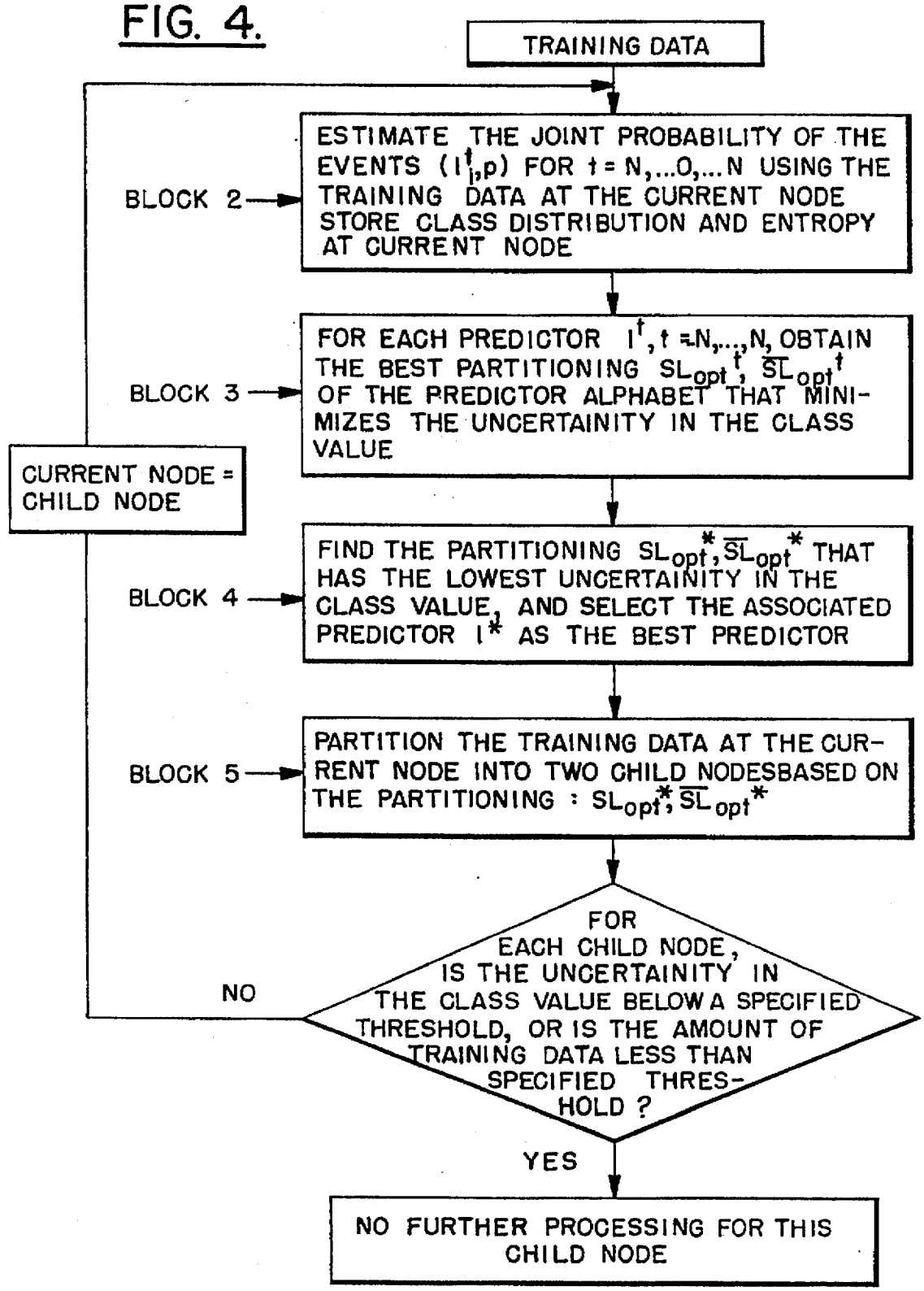
FIG. 4 is a flow chart describing a procedure for constructing a decision tree to predict the probability distribution of a class at a given time, in accordance with the invention.

FIG. 4 is a flow chart depicting the procedure to construct a decision tree to predict a probability distribution on the class values at time t, given the quantized feature vectors at times t−N,t−N+1, . . . t, . . . , t+N. For the purpose of explaining the working of the invention, the quantized feature vectors will henceforth be referred to as labels. The predictors used in the decision tree are the labels at times t−N, . . . ,t . . . ,t+N, represented as $l^{-N}, \ldots l^0, \ldots ,l^{+N}$, and the predicted quantity is either a distribution over two classes as in the case of the boundary-detection decision tree, i.e., the probability that the time t is a phone boundary, or a distribution over all possible ranks of the correct phone at time t, as in the case of the rank-determining decision tree. The size of the class alphabet in the second case is equal to the size of the phone alphabet, denoted as P. The size of the label alphabet is denoted as L. Typically, P ranges from 50–100, and L is in the 100's; however, for the purpose of explaining the invention, we will assume that L=4, P=3, and N=1. We will represent these 4 predictor values as $l_1, l_2, l_3$, and $l_4$, and the 3 class values as $p_1$, $p_2$, and $p_3$.

The technique described below uses the procedure of U.S. Pat. No. 5,263,117 to determine the binary partitioning of the predictor alphabet at a node of the decision tree, which is appropriate for the case of the rank-determining decision tree, where the number of classes is larger than 2. However, for the boundary-detection decision tree, where the number of classes is equal to 2, [U.S. Pat. No. 5,263,117 incorporated herein by reference and titled "Method and Apparatus for Finding the Best Splits in a Decision Tree for a Language Model"] reduces to the simpler optimal strategy of [L. Breiman, J. H. Friedman, R. A. Olshen, C. J. Stone, "Classification and Regression Trees" Wadsworth, Inc., 1984].

The training data consists of a number of transcribed sentences, with the acoustic corresponding to each sentence being quantized into a sequence of labels. Further as the data is transcribed, it is also possible to assign a class value to every time frame.

If the event $l_p^k$ is defined as one where the value of the predictor $l^k$ is equal to $l_i$, and the class value is equal to p, then a confusion matrix is next created (Block 2), which enumerates the counts of all possible events $(l_i^k, p)$. The matrix has L rows, and P columns, and the entry corresponding to the $i^{th}$ row and the $j^{th}$ column represents the number of times the value of the predictor $l^k$ equalled $l_i$, when the class value equalled $p_j$, in the training data at the current node of the decision tree (at the root node, all the training data is used). These counts are then converted into joint probabilities by computing the sum of all entries in the matrix, and then dividing each entry of the matrix by this sum. As there are 2N+1 predictors, 2N+1 joint distribution matrixes can be created, one for each predictor. An example of these joint distribution matrices is shown in Table 2 below, for the case of 3 predictors $1^{-1}$, $1^0$, and $1^{+1}$.

TABLE 2

| $1^{-1}$ | $P_1$ | $P_2$ | $P_3$ |
|---|---|---|---|
| $l_1$ | 0.1 | 0.067 | 0.033 |
| $l_2$ | 0.067 | 0.167 | 0.033 |
| $l_3$ | 0.133 | 0.033 | 0.1 |
| $l_4$ | 0.033 | 0.067 | 0.167 |

| $1^0$ | $P_1$ | $P_2$ | $P_3$ |
|---|---|---|---|
| $l_1$ | 0.133 | 0.05 | 0.033 |
| $l_2$ | 0.067 | 0.2 | 0.034 |
| $l_3$ | 0.1 | 0.034 | 0.067 |
| $l_4$ | 0.033 | 0.05 | 0.2 |

| $1^{+1}$ | $P_1$ | $P_2$ | $P_3$ |
|---|---|---|---|
| $l_1$ | 0.117 | 0.05 | 0.033 |
| $l_2$ | 0.067 | 0.167 | 0.033 |
| $l_3$ | 0.116 | 0.05 | 0.1 |
| $l_4$ | 0.033 | 0.067 | 0.167 |

The class distribution at the current node and its entropy is computed and stored at this point. The class distribution is obtained by summing up the rows of any one of the 2N+1 joint distribution matrices, i.e.

$$Pr(p-p_k) = \sum_{j=1}^{4} Pr(l^k - l_j, p - p_k),$$

and the entropy of the class distribution is obtained as $$H(p) = \sum_{i=1}^{3} -Pr(p - p_i)\log[Pr(p - p_i)].$$

For the considered example, the class distribution and its entropy is given in Table 3. The log in H(p) is base 2.

TABLE 3

| | $P_1$ | $P_2$ | $P_3$ |
|---|---|---|---|
| Pr | 0.333 | 0.334 | 0.333 |
| | H(p) = 1.58 | | |

In Block 3, we start with the joint distribution of the $k^{th}$ predictor, $l^k$ and the class p, and design a binary partitioning $SL_{opt}^k$, $\overline{SL_{opt}^k}$ of the values of the predictor $l^k$ using the method of [U.S. Pat. No. 5,236,117 referenced above]. In other words, for each predictor, the predictor alphabet $[l_1, l_2, l_3, l_4]$ is partitioned into two complementary sets, $SL_{opt}^k$ and $\overline{SL_{opt}^k}$, (for example, $SL_{opt}^k = [l_1, l_2]$, and $\overline{SL_{opt}^k} = [l_3, l_4]$), with the criterion for the selection of the partition being the minimization of the class uncertainty. The entropy of the class distribution is used as a measure of the uncertainty. The details of this method are given in [U.S. Pat. No. 5,236,117]. This process is carried out of each predictor independently. For the considered example, one iteration of the procedure in [U.S. Pat. No. 5,236,117, col. 4, line 30—col. 9, line 25] leads to a nearly optimal partitioning of the different predictors as follows:

$$SL_{opt}^{-1}=[l_1,l_2], \overline{SL_{opt}}^{-1}=[l_3,l_4];$$

$$SL_{opt}^{0}=[l_1,l_2,l_3], \overline{SL_{opt}}^{0}=[l_4], SL_{opt}^{+1}=[l_1,l_2], \text{ and } \overline{SL_{opt}}^{+1}=[l_3,l_4].$$

Now, for each one of the predictors $i^k$, the training data at the current node may be split into two parts based on the partitioning $SL_{opt}^k$, $\overline{SL_{opt}^k}$, and the probability of these two child nodes is given as:

$$Pr(SL_{opt}^k) = \sum_{k=1}^{3} \sum_{j \in S_{opt}^k} Pr(l^k - l_j, p - p_k),$$

and $$Pr(\overline{SL_{opt}^k}) = \sum_{k=1}^{3} \sum_{j \in \overline{SL_{opt}^k}} Pr(l^k - l_j, p - p_k),$$

Further, the class distribution conditioned on the partitioning, at the two child nodes may be calculated as follows:

$$Pr(p-p_m/SL_{opt}^k) = \sum_{j \in SL_{opt}^k} Pr(l^k - l_j, p - p_m)/Pr(SL_{opt}^k)$$

and $$Pr(p-p_m/\overline{SL_{opt}^k}) = \sum_{j \in \overline{SL_{opt}^k}} Pr(l^k - l_j, p - p_m)/Pr(\overline{SL_{opt}^k})$$

The entropy for each of these child nodes can be calculated just as for the parent node and the average entropy of the two child nodes computed as $H_{avg}^k = Pr(SL_{opt}^k)H(p/SL_{opt}^k) + Pr(\overline{SL_{opt}^k})H(p/\overline{SL_{opt}^k})$. For the considered example, these quantities are tabulated in Table 4 below.

| | CLASS VALUE $P_1$ | CLASS VALUE $P_2$ | CLASS VALUE $P_3$ |
|---|---|---|---|
| Pr $(p/SL^{-1}_{opt})$ | 0.358 | 0.500 | 0.142 |
| Pr $(p/\overline{SLSL}^{-1}_{opt})$ | 0.312 | 0.188 | 0.500 |
| Pr $(p/SL^{0}_{opt})$ | 0.418 | 0.396 | 0.187 |
| Pr $(p/\overline{SLSL}^{0}_{opt})$ | 0.117 | 0.177 | 0.707 |

-continued

| | CLASS VALUE $P_1$ | CLASS VALUE $P_2$ | CLASS VALUE $P_3$ |
|---|---|---|---|
| $Pr\ (p/SL^{+1}_{opt})$ | 0.394 | 0.465 | 0.141 |
| $Pr\ (p/SL\overline{SL}^{+1}_{opt})$ | 0.280 | 0.220 | 0.500 |

$Pr(SL_{opt}^{-1})$=0.467 $Pr(\overline{SL_{opt}}^{-1})$=0.533) $H(p/SL_{opt}^{-1})$=1.43 $H(p/\overline{SL_{opt}}^{-1})$=1.477 $H_{avg}^{-1}$=1.455

$Pr(SL_{opt}^{0})$=1.717 $Pr(\overline{SL_{opt}}^{0})$=0.283 $H(p/SL_{opt}^{0})$=1.508 $H(p/\overline{SL_{opt}}^{0})$=1.158 $H_{avg}^{0}$=1.409

$Pr(SL_{opt}^{-1})$=0.467 $Pr(\overline{SL_{opt}}^{-1})$=0.533 $H(p/SL_{opt}^{-1})$=1.442 $H(p/\overline{SL_{opt}}^{+1})$=1.495 $H_{avg}^{+1}$=1.470

In Block 4, the reduction in class uncertainty associated with the best question for each predictor is tabulated, and the predictor which provides the largest reduction in uncertainty is selected. The reduction in uncertainty due to a partitioning based on $SL_{avg}^{k}$ is computed as $H(p)-H_{avg}^{k}$. For the considered example, we have $H(p)$=1.58, $H_{avg}^{-1}$=1.455, $H_{avg}^{0}$=1.409 and $H_{avg}^{+1}$=1.470. Hence, the selected predictor is $1^{0}$, as this gives the maximum reduction in the uncertainty of the predicted class.

In Block 5, the training data at the current node is partitioned into two parts on the basis of the optimal partitioning of the selected predictor at the current node.

Subsequently, depending on the class uncertainty and the amount of training data at a child node, the process goes back to Block 2, and starts again by recomputing the joint distribution on the basis of only the training data at the child node. The processing at a child node terminates when the class uncertainty at the child node falls below a specified threshold, or if the amount of training data at a child node falls below a specified threshold.

Figure 5:
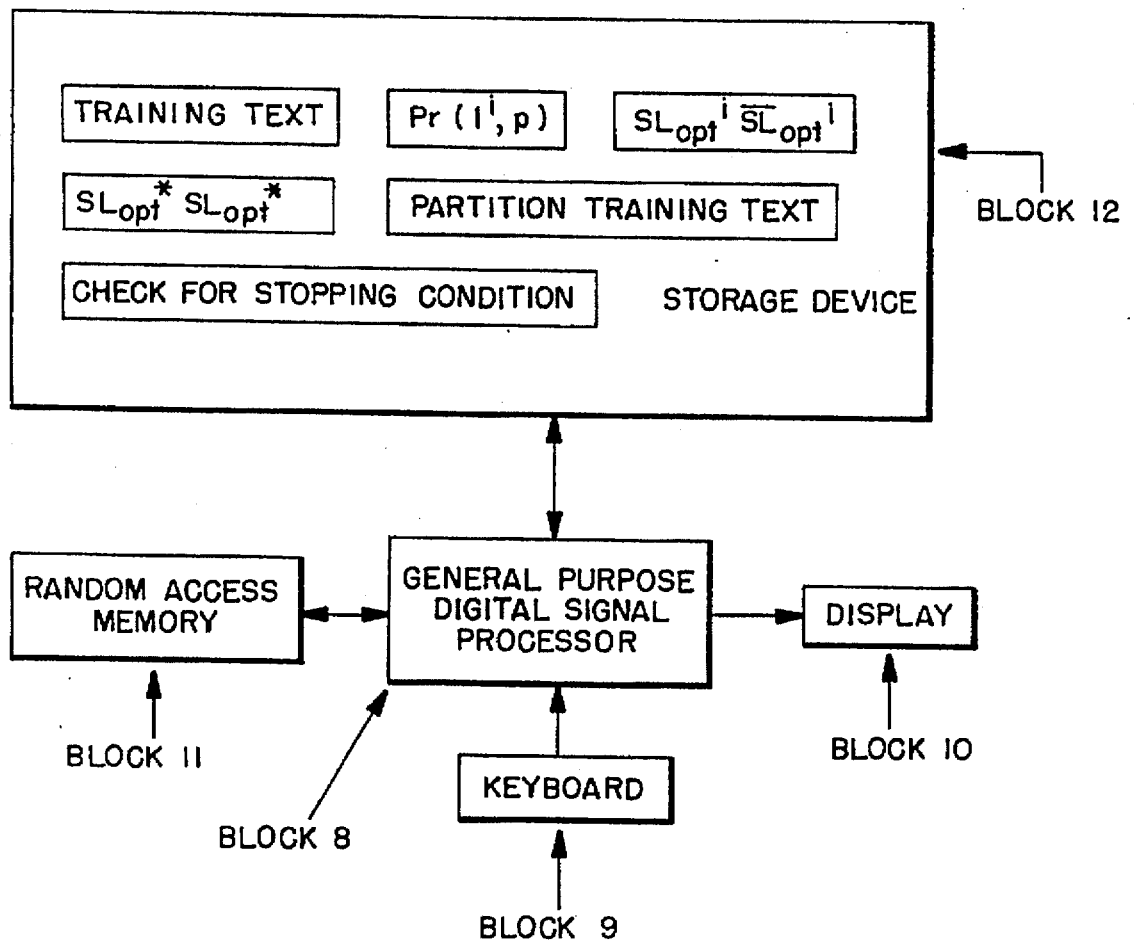
FIG. 5 is a schematic for constructing a decision tree.

FIG. 5 schematically shows an apparatus for constructing the decision tree. The apparatus may comprise of, for example, an appropriately programmed computer system. In this example, the apparatus comprises of a general purpose digital processor 8 having a data entry keyboard 9, a display 10, a random access memory 11, and a storage device 12. From the training data, processor 8 computes the joint distribution of the predictor $l^k$ and the class value p, for the first decision tree, for all 2N+1 predictors, using all of the training data, and stores the estimated joint distribution, along with the class distribution, in storage device 12.

Next processor 8 computes the best partitioning of each of the predictor values such that the maximum reduction in class uncertainty is obtained due to the partitioning, according to the algorithm of [U.S. Pat. No. 5,236,117]. Then processor 8 chooses the best predictor, l*, and partitions the training data into two child nodes based on the best partitioning for the predictor l*.

Still under the control of the program, the processor 10 repeats the above procedure for the data at each of the two child nodes, till the class entropy at the node falls below a specified threshold, or till the amount of training data at a node falls below a specified threshold.

After the decision tree is grown, still under control of the program, the processor computes a distribution on class values for every node of the decision tree, and stores it in storage device 12. The above process is then repeated to construct the second decision tree. For the case of the second decision tree, the probability distribution over all possible ranks, which is stored at every node of the tree is converted into a single number, the worst case rank of the correct phone, by choosing the worst case rank as the class value at which the cumulative probability distribution of the classes exceeds a specified threshold.

Figure 6:
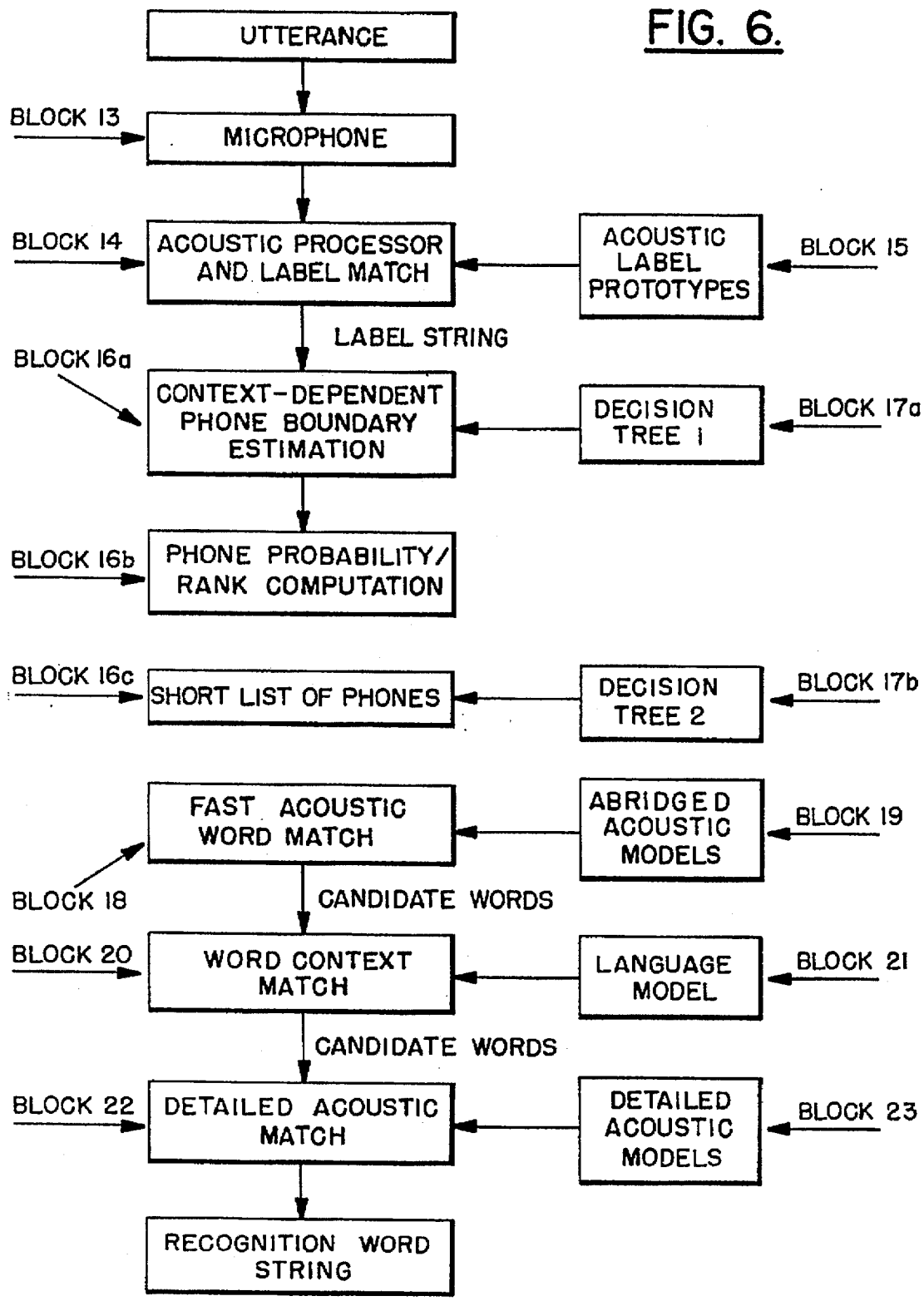
FIG. 6 is a flow chart of an automatic speech recognition system using two decision trees.

FIG. 6 is a block diagram of an automatic speech recognition system which utilizes the decision tree according to the present invention. The system in FIG. 6 includes a microphone 13 for converting an utterance into an electrical signal. The signal from the microphone is processed by an acoustic processor and label match 14 which finds the best-matched acoustic label prototype from the acoustic label prototype store 15. A probability distribution on phone boundaries 16a is then produced for every time frame using the first decision tree 17a described in the invention. These probabilities are compared to a threshold and some time frames are identified as boundaries between phones. Subsequently, an acoustic score is computed 16b, for all phones between every given pair of hypothesized boundaries, and the phones are ranked on the basis of this score. Note that this score may be computed in any fashion, with the only constraint being that the score is computed using the same technique as was used when constructing the second decision tree. Subsequently, the second decision tree 17b is traversed for every time frame to obtain the worst case rank of the correct phone at that time, and using the phone score and phone rank computed in 16b, a shortlist of allowed phones 16c is made up for every time frame. This information is used to select a subset of acoustic word models in store 19, and a fast acoustic word match processor 18 matches the label string from the acoustic processor 14 against this subset of abridged acoustic word models to produce an output signal.

The output of the fast acoustic word match processor comprises of at least one word. In general, however, the fast acoustic word match processor will output a number of candidate words.

Each word produced by the fast acoustic word match processor 18 is input into a word context match 20 which compares the word context to language models in store 21 and outputs at least one candidate word. From the recognition candidates produced by the fast acoustic match and the language model, the detailed acoustic match 22 matches the label string from the acoustic processor 14 against detailed acoustic word models in store 23 and outputs a word string corresponding to an utterance.

Figure 7:
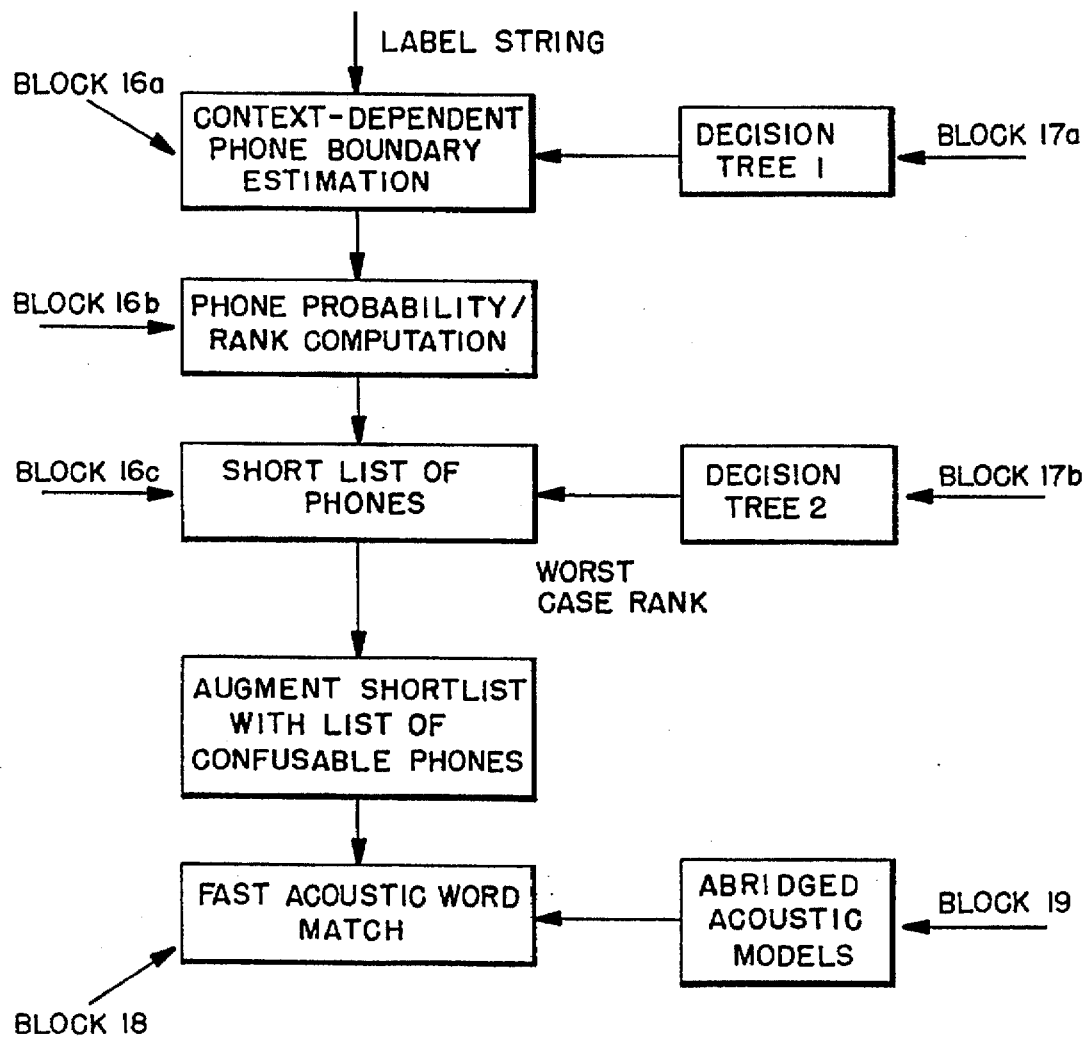
FIG. 7 is a flow chart of an automatic speech recognition system using two decision trees.

FIG. 7 describes Blocks 16a–c and 17a–b in further detail. Given the acoustic label string from the acoustic processor 14, the context-dependent boundary estimation process 16 traverses the first decision tree 17a for every time frame using the label at the current time and the labels at the adjacent times as the predictors, until it reaches a terminal node of the tree. Then the probability that the current time is a phone boundary is picked up from the stored class distribution at the leaf, and compared to a threshold. If the probability is larger than the threshold, it is hypothesized that the current time is a phone boundary.

Subsequently, an acoustic score is computed for every phone between every pair of boundary points and the phones are ranked on the basis of these scores. One of several techniques could be used to compute this score, of example, the usual markov based computation could be used, or a channel-bank-based computation as described in ["Channel-Bank-Based Thresholding to improve Search Time in the Fast Match", IBM TDB pp. 113–114, vol. 37, No. 02A, February 1994] could be used, or a decision-tree-based scoring mechanism, as described in [D. Nahamoo, M. Padmanabhan, M. A. Picheny, P. S. Gopalkrishnan, "A Decision Tree Based Pruning Strategy for the Acoustic Fast Match", IBM Attorney Docket No. YO 996-059]; the only constraint on the scoring mechanism is that the same mechanism should be used as was used when obtaining the training records for the second decision tree.

Subsequently, the second decision tree 17b is traversed for every time frame, using the label at the current time and at the adjacent times as the predictors, till a terminal node of the tree is reached. The worst case rank of the correct phone is read from the data stored at this node and taken to be the worst case rank of the correct phone at this time. Subsequently, the worst of the worst-case ranks between any two adjacent hypothesized phone boundaries is taken to be the worst case rank of the correct phone in the segment between the phone boundaries. All the phones whose ranks are worse than this worst case rank are then discarded in the current segment, and a shortlist of allowed phones is made up for the segment.

Now, it is often the case that some phones are very similar and may be easily confused with each other. Lists of such confusable phones can be made from the training data, and the shortlist described above may be augmented by adding in these lists of confusable phones. For instance, if the rank of any one element in a list of confusable phones is better than the worst case rank, the entire set of confusable phones are included in the short list.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method of recognizing speech, comprising the steps of:
   a) inputting a plurality of words of training data;
   b) training a plurality of first binary decision trees to ask a maximally informative question at each node based upon contextual information in the training data, wherein each first binary decision tree corresponds to a different time in a sequence of the training data;
   c) traversing one of the first binary decision trees for every time frame of an input sequence of speech to determine a probability distribution for every time frame, the probability distribution being the probability that a node is a phone boundary;
   d) comparing the probabilities associated with the time frames with a threshold for identifying some time frames as boundaries between phones;
   e) providing an acoustic score for all phones between every given pair of boundaries to generate a second binary decision tree of such acoustic scores;
   f) traversing the second binary decision tree of such acoustic scores for all phones to rank the phones from best to worst on the basis of this score; and
   g) outputting a recognition result in response to the score.

2. A method of recognizing speech, comprising the steps of:
   inputting a plurality of words of training data;
   b) training a plurality of binary first decision trees to ask a maximally informative question at each node based upon contextual information in the training data, wherein each binary first decision tree corresponds to a different time in a sequence of the training data;
   c) traversing one of the decision trees for every time frame of an input sequence of speech to determine a probability distribution for every time frame, the probability distribution being the probability that a node is a phone boundary;
   d) comparing the probabilities associated with the time frames with a threshold for identifying some time frames as boundaries between phones;
   e) providing an acoustic score for all phones between every given pair of boundaries;
   f) ranking the phones on the basis of this score;
   outputting a recognition result in response to the score;
   h) traversing one or more of a second set of decision trees for every time frame on an input sequence of speech to determine a second probability distribution, the probability distribution being a distribution over all possible ranks that the correct phone can take for obtaining a worst case rank of a correctly recognized phone by choosing the worst case rank as the class value at which the cumulative probability distribution of the classes exceeds a specified threshold;
   i) assigning as the absolute worst case rank of the worst case ranks between any two adjacent phone boundaries the worst case rank of the correctly recognized phone between the phone boundaries;
   j) discarding all phones whose rank is worse than this absolute worst case rank in the current segment;
   k) making a short list of phones for the segment; and
   l) outputting a recognition result in response to the short list of the recognition result being a short list of words.

3. A method of recognizing speech, comprising the steps of:
   a) inputting a plurality of words of training data;
   b) training a plurality of binary first decision trees to ask a maximally informative question at each node based upon contextual information in the training data, wherein each binary first decision tree corresponds to a different time in a sequence of the training data;
   c) traversing one of the decision trees for every time frame of an input sequence of speech to determine a probability distribution for every time frame, the probability distribution being the probability that a node is a phone boundary;
   d) comparing the probabilities associated with the time frames with a threshold for identifying some time frames as boundaries between phones;
   e) providing an acoustic score for all phones between every given pair of boundaries;
   f) ranking the phones on the basis of this score;
   outputting a recognition result in response to the score;
   h) traversing one or more of a second set of decision trees for every time frame on an input sequence of speech to determine a second probability distribution, the probability distribution being a distribution over all possible ranks that a phone can take for obtaining a worst case rank of a correctly recognized phone by choosing the worst case rank as the class value at which the cumulative probability distribution of the classes exceeds a specified threshold;
   i) assigning as the absolute worst case rank of the worst case ranks between any two adjacent phone boundaries the worst case rank of the correctly recognized phone between the phone boundaries;
   j) discarding all phone boundaries whose rank is worse than this absolute worst case rank in the current segment;

k) making a short list of phones for the segment;

l) comparing constituent phones of a word in a vocabulary to see if the word lies in the short list and making up a short list of words; and m) outputting a recognition result by comparing the words of the short list with a language model to determine the most probable word match for the input sequence of speech.

4. A method for recognizing speech, comprising the steps of:

a) entering a string of utterances constituting training data;

b) converting the utterances of the training data to electrical signals;

c) representing the electrical signal of the training data as prototype quantized feature vectors, one feature vector representing a given time frame;

d) assigning to each prototype feature vector a class label associated with the prototype quantized feature vector;

e) forming a plurality of binary decision trees for different times in the training data, each tree having a root node and a plurality of child nodes, comprising the steps of:

i. creating a set of training records comprising 2K+1 predictors, $l^k$, and one predicted class, p, where the 2K+1 predictors are feature vector labels at 2K+1 consecutive times t−K, ..., t, ..., t+K, and the predicted class is a binary record indicator whether time t is associated with a phone boundary in the case of the first decision tree or is associated with the correct phone in the case of the second decision tree;

ii. computing the estimated joint distribution of predictors $l^k$ and phone p for 2K+1 predictors using the training data, wherein the predictors are feature vector labels at times t−K, ..., t, ..., t+K and p is the phone at time t;

iii. storing the estimated joint distribution of $l^k$ and p and a corresponding distribution for each predictor $l^k$ at the root node;

iv. computing the best partitioning of the values that predictor $l^k$ can take for each $l^k$ to minimize phone uncertainty at each node; and v. choosing the predictor $l^k$ whose partitioning results in the lowest uncertainty and partitioning the training data into two child nodes based on the computed-based partitioning $l^k$, each child node being assigned a class distribution based on the training data at the child node;

f) repeating for each child node if the amount of training data at the child node is greater than a threshold;

g) inputting an utterance to be recognized;

h) converting the utterance into an electrical signal;

i) representing the electrical signal as a series of quantized feature vectors;

j) matching the series of quantized feature vectors against the stored prototype feature vectors to determine a closest match and assigning an input label to each of the series of feature vectors corresponding to the label of the closest matching prototype feature vector;

k) traversing one of the decision trees for every time frame of an input sequence of speech to determine a probability distribution for every time frame, the probability distribution being the probability that a node is a phone boundary;

l) comparing the probabilities associated with the time frames with a threshold for identifying some time frames as boundaries between phones;

m) providing an acoustic score for all phones between every given pair of boundaries;

n) ranking the phones on the basis of this score; and o) outputting a recognition result in response to the score.

5. The method of claim 4 further including the steps of:

traversing one or more of a second set of decision trees for every time frame on an input sequence of speech to determine a second probability distribution, the probability distribution being a distribution over all possible ranks that a phone can take for obtaining a worst case rank of a correctly recognized phone by choosing the worst case rank as the class value at which the cumulative probability distribution of the classes exceeds a specified threshold;

assigning as the absolute worst case rank of the worst case ranks between any two adjacent phone boundaries the worst case rank of the correctly recognized phone between the phone boundaries;

discarding all phone boundaries whose rank is worse than this absolute worst case rank in the current segment;

making a short list for the segment; and outputting a recognition result in response to the short list.

6. An apparatus for recognizing speech, comprising:

a) means for inputting a plurality of words of training data;

b) means for training a plurality of first binary decision trees to ask a maximally informative question at each node based upon contextual information in the training data, wherein each first binary decision tree corresponds to a different time in a sequence of the training data;

c) means for traversing one of the first binary decision trees for every time frame of an input sequence of speech to determine a probability distribution for every time frame, the probability distribution being the probability that a node is a phone boundary;

d) means for comparing the probabilities associated with the time frames with a threshold for identifying some time frames as boundaries between phones;

e) means for providing an acoustic score for all phones between every given pair of boundaries to generate a second binary decision tree of such acoustic scores;

f) means for traversing the second binary decision tree of such acoustic scores for all phones to rank the phones from best to worst on the basis of this score; and g) means for outputting a recognition result in response to the score.

7. An apparatus for recognizing speech, comprising:

a) means for inputting a plurality of words of training data;

b) means for training a plurality of binary first decision trees to ask a maximally informative question at each node based upon contextual information in the training data, wherein each binary first decision tree corresponds to a different time in a sequence of the training data;

c) means for traversing one of the decision trees for every time frame of an input sequence of speech to determine a probability distribution for every time frame, the probability distribution being the probability that a node is a phone boundary;

d) means for comparing the probabilities associated with the time frames with a threshold for identifying some time frames as boundaries between phones;

e) means for providing an acoustic score for all phones between every given pair of boundaries;
means for ranking the phones on the basis of this score; and
means for outputting a recognition result in response to the score;
h) means for traversing one or more of a second set of decision trees for every time frame on an input sequence of speech to determine a second probability distribution, the probability distribution being a distribution over all possible ranks that the correct phone can take for obtaining a worst case rank of a correctly recognized phone by choosing the worst case rank as the class value at which the cumulative probability distribution of the classes exceeds a specified threshold;
i) means for assigning as the absolute worst case rank of the worst case ranks between any two adjacent phone boundaries the worst case rank of the correctly recognized phone between the phone boundaries;
j) means for discarding all phones whose rank is worse than this absolute worst case rank in the current segment;
k) means for making a short list of phones for the segment; and
l) means for outputting a recognition result in response to the short list of the recognition result being a short list of words.

8. An apparatus for recognizing speech, comprising:
a) means for inputting a plurality of words of training data;
b) means for training a plurality of binary first decision trees to ask a maximally informative question at each node based upon contextual information in the training data, wherein each binary first decision tree corresponds to a different time in a sequence of the training data;
c) means for traversing one of the decision trees for every time frame of an input sequence of speech to determine a probability distribution for every time frame, the probability distribution being the probability that a node is a phone boundary;
d) means for comparing the probabilities associated with the time frames with a threshold for identifying some time frames as boundaries between phones;
e) means for providing an acoustic score for all phones between every given pair of boundaries;
f) means for ranking the phones on the basis of this score; and
g) means for outputting a recognition result in response to the score;
h) means for traversing one or more of a second set of decision trees for every time frame on an input sequence of speech to determine a second probability distribution, the probability distribution being a distribution over all possible ranks that a phone can take for obtaining a worst case rank of a correctly recognized phone by choosing the worst case rank as the class value at which the cumulative probability distribution of the classes exceeds a specified threshold;
i) means for assigning as the absolute worst case rank of the worst case ranks between any two adjacent phone boundaries the worst case rank of the correctly recognized phone between the phone boundaries;
j) means for discarding all phone boundaries whose rank is worse than this absolute worst case rank in the current segment;

k) means for making a short list of phones for the segment;
l) means for comparing constituent phones of a word in a vocabulary to see if the word lies in the short list and making up a short list of words; and
m) means for outputting a recognition result by comparing the words of the short list with a language model to determine the most probable word match for the input sequence of speech.

9. An apparatus for recognizing speech, comprising:
a) means for entering a string of utterances constituting training data;
b) means for converting the utterances of the training data to electrical signals;
c) means for representing the electrical signal of the training data as prototype quantized feature vectors, one feature vector representing a given time frame;
d) means for assigning to each prototype feature vector a class label associated with the prototype quantized feature vector;
e) means for forming a plurality of binary decision trees for different times in the training data, each tree having a root node and a plurality of child nodes, comprising the steps of:
  i. means for creating a set of training records comprising 2K+1 predictors, $l^k$, and one predicted class, p, where the 2K+1 predictors are feature vector labels at 2K+1 consecutive times t−K, ..., t, ..., t+K, and the predicted class is a binary record indicator whether time t associated with a phone boundary in the case of the first decision tree or is associated with the correct phone in the case of the second decision tree;
  ii. means for computing the estimated joint distribution of predictors $l^k$ and phone p for 2K+1 predictors using the training data, wherein the predictors are feature vector labels at times t−K, ..., t, ..., t+K and p is the phone at time t;
  iii. means for storing the estimated joint distribution of $l^k$ and p and a corresponding distribution for each predictor $l^k$ at the root node;
  iv. means for computing the best partitioning of the values that predictor $l^k$ can take for each $l^k$ to minimize phone uncertainty at each node; and
  v. means for choosing the predictor $l^k$ whose partitioning results in the lowest uncertainty and partitioning the training data into two child nodes based on the computed-based partitioning $l^k$, each child node being assigned a class distribution based on the training data at the child node;
f) means for repeating for each child node if the amount of training data at the child node is greater than a threshold;
g) means for inputting an utterance to be recognized;
h) means for converting the utterance into an electrical signal;
i) means for representing the electrical signal as a series of quantized feature vectors;
j) means for matching the series of quantized feature vectors against the stored prototype feature vectors to determine a closest match and assigning an input label to each of the series of feature vectors corresponding to the label of the closest matching prototype feature vector;
k) means for traversing one of the decision trees for every time frame of an input sequence of speech to determine a probability distribution for every time frame, the probability distribution being the probability that a node is a phone boundary;

l) means for comparing the probabilities associated with the time frames with a threshold for identifying some time frames as boundaries between phones;

m) means for providing an acoustic score for all phones between every given pair of boundaries;

n) means for ranking the phones on the basis of this score; and o) means for outputting a recognition result in response to the score.

10. The apparatus of claim 9 further including:

means for traversing one or more of a second set of decision trees for every time frame on an input sequence of speech to determine a second probability distribution, the probability distribution being a distribution over all possible ranks that a phone can take for obtaining a worst case rank of a correctly recognized phone by choosing the worst case rank as the class value at which the cumulative probability distribution of the classes exceeds a specified threshold;

means for assigning as the absolute worst case rank of the worst case ranks between any two adjacent phone boundaries the worst case rank of the correctly recognized phone between the phone boundaries;

means for discarding all phone boundaries whose rank is worse than this absolute worst case rank in the current segment;

means for making a short list for the segment; and means for outputting a recognition result in response to the short list.

* * * * *